AUTOMATIC FREQUENCY CONTROLLED SIGNAL GENERATOR

Filed March 11, 1966

INVENTOR.
Charles F. Hepner
BY James E. Tracy
Attorney 3,319,179
AUTOMATIC FREQUENCY CONTROLLED SIGNAL GENERATOR Charles F. Hepner, Chicago, Ill., assignor to Zenith Radio Corporation, Chicago, Ill., a corporation of Delaware Filed Mar. 11, 1966, Ser. No. 533,626
11 Claims. (Cl. 331—8)

ABSTRACT OF THE DISCLOSURE

A variable impedance network, controlled by an AFC voltage, and a series-connected capacitor are coupled across the resonant circuit of an oscillator to control the frequency of the oscillating signal developed by the circuit. The network includes a transistor, a conductive path of which is shunted by an oppositely poled diode. The impedance of the network, with respect to the half cycles of one polarity of the oscillating signal, is determined by the conductive path of the transistor while the network impedance, seen by the half cycles of the other polarity, is provided by the diode. The impedance of both the conductive path and diode effectively change in response to a variation of the AFC voltage which is applied to the input of the transistor.

Figure 1:
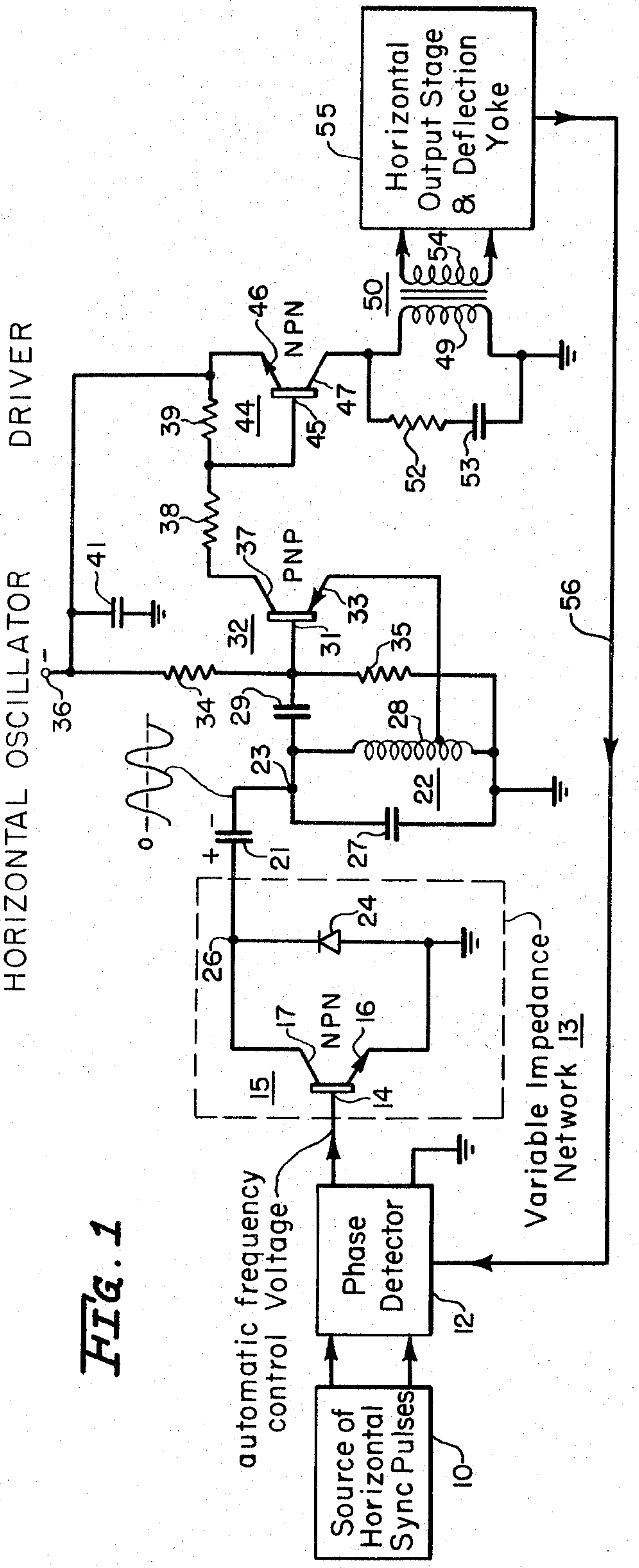

This invention pertains to an automatic frequency or phase controlled alternating signal generator. It is particularly useful when incorporated in the horizontal or line scanning system of a television receiver for controlling the frequency and phase of the scanning or sweep signal; hence, the invention will be described in that environment.

It is customary to employ, in sweep systems for achieving horizontal scanning of television receivers, an automatic frequency control (AFC) circuit to insure that precise frequency and phase synchronism is maintained between the horizontal synchronizing pulses of the received television signal and the line scanning signal for the picture tube. One well known automatic frequency controlled sweep signal generator employs a free-running oscillator having a resonant circuit, usually a parallel resonant circuit, for primarily determining the free-running operating frequency of the oscillator. At least a portion of the resonant circuit is shunted by a capacitor connected in series with the output terminals of a variable impedance device, the impedance across those output terminals being determined by an automatic frequency control or error signal applied to the input terminals of the device. The influence or effectiveness of the capacitor in determining the operating frequency of the oscillator is inversely proportional to the impedance presented by the output of the device.

The automatic frequency control signal, usually developed by a phase detector which compares the horizontal sync pulses with a signal derived from the output of the oscillator, varies in amplitude in accordance with the phase relationship between the two compared signals. The variable impedance device may take the form of a semiconductor device, such as a transistor, the impedance at its output terminals changing in response to amplitude variations of the AFC signal applied to its input terminals. The impedance varies, under control of the AFC signal, any time the phase between the horizontal sync pulses and the sweep signal deviates from a fixed relation, with the result that the oscillator is controlled to operate in precise step or synchronism with the sync pulses.

Unfortunately, the sensitivity of this prior arrangement is rather limited. The hold-in frequency range (the range of frequencies over which the AFC system maintains control) is restricted. When the oscillator shifts in phase or frequency out of its relatively narrow hold-in range, the resulting impedance change will be insufficient in amount to bring the oscillator back in synchronism with the line syncs. Applicant's AFC system, on the other hand, is highly sensitive to frequency changes of the oscillator and achieves results not obtainable heretofore. The invention, in accordance with one of its aspects, includes the same general arrangement of a capacitor and a series-connected automatic frequency controlled variable impedance device coupled in shunt with at least a portion of the resonant circuit of an oscillator. However, the oscillator may stray or drift over a substantially greater hold-in frequency range and the impedance change will still be of appropriate magnitude to bring it back in step.

It is, therefore, an object of the present invention to provide a new and improved AFC circuit for controlling a signal generator.

It is another object of the invention to overcome deficiencies and disadvantages of prior AFC circuits.

It is a further object to provide a new and improved control circuit for adjusting the oscillator frequency of a local oscillator in a television receiver.

An automatic frequency controlled signal generator, constructed in accordance with one aspect of the invention, comprises a free-running oscillator which includes a resonant circuit for primarily determining the free-running operating frequency of the oscillator. There is a variable impedance network including a semiconductor device having input, output and common terminals with an input conductive path between its input and common terminals in a predetermined direction and an output conductive path between its output and common terminals in a predetermined direction, and a unidirectional device coupled at least partially in shunt with one of the conductive paths and poled to conduct in a direction opposite to that of the shunted path. The impedance presented by the network varies over a relatively wide range in response to amplitude variations of a control signal applied between the input and common terminals. A series arrangement, including the variable impedance network and a capacitor, is coupled in shunt with at least a portion of the resonant circuit, the effectiveness of the capacitor in determining the operating frequency of the oscillator being inversely proportional to the impedance presented by the network. Means are also provided for applying an automatic frequency control signal between the input and common terminals to control the impedance of the impedance network thereby to control the operating frequency of the oscillator.

In accordance with another aspect of the invention, the variable impedance network includes a junction type transistor having a base, a collector and an emitter, connected in common base configuration, which presents across its collector-base junction an impedance which varies in response to amplitude changes of a control signal applied between its emitter and base. A series arrangement, which is coupled in shunt with at least a portion of the resonant circuit, includes the collector-base junction of the transistor and a capacitor.

The invention provides, according to another aspect, a novel automatic frequency controlled variable impedance network which may be utilized to at least partially determine the operating frequency of an oscillator in accordance with the impedance presented by the network.

Figure 2:
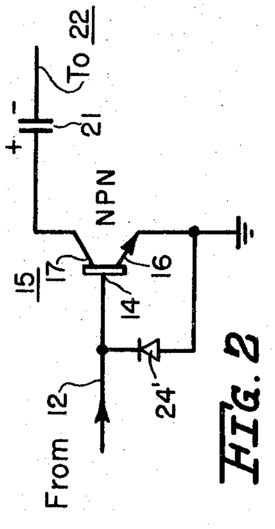
Figure 3:
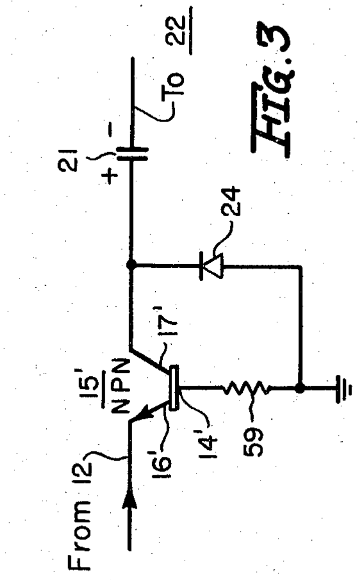

The features of this invention which are believed to be new are set forth with particularity in the appended claims. The invention, together with further objects and advantages thereof, may best be understood, however, by reference to the following description in conjunction with the accompanying drawing in which:

FIGURE 1 is a schematic diagram of a horizontal sweep system for a television receiver and embodies the automatic frequency control apparatus of the invention; and FIGURES 2 and 3 illustrate the manner in which the AFC circuit of FIGURE 1 may be modified in accordance with additional embodiments of the invention.

Turning now to a structural description of the scanning system of FIGURE 1, a source 10 of horizontal or line synchronizing pulses, preferably the synchronizing signal separator of a television receiver, has its output terminals connected to one input circuit of a phase detector 12. One output terminal of the phase detector is connected to a plane of reference potential, such as ground, while the other output terminal is connected to the input of a variable impedance network or device 13 which includes a semiconductor device 15 and a unidirectional device 24. More particularly, the semiconductor device takes the form of a junction type NPN transistor, having a base 14, an emitter 16 and a collector 17, connected in common emitter configuration; hence, semiconductor device 15 effectively has input, output and common terminals connected respectively to base 14, collector 17 and emitter 16. There is an input conductive path between the input and common terminals in a predetermined direction (namely the base-emitter conduction path in which current flows from base to emitter), and an output conductive path between the output and common terminals in a predetermined direction (namely the emitter-collector conduction path in which current flows in the direction from collector to emitter).

Base 14 is connected to the ungrounded terminal of phase detector 12, emitter 16 is grounded, and collector 17 is coupled through a capacitor 21 to one terminal (labeled 23 in the drawing) of a parallel resonant or tank circuit 22, included in a free-running horizontal oscillator, the other terminal of the tank circuit being grounded. Unidirectional device 24 takes the form of a diode and is shunted across the output or emitter-collector conduction path of transistor 15. Specifically, the cathode terminal of diode 24 is connected to collector 17, and thus to the left terminal of capacitor 21, while the anode terminal is grounded. Note that diode 24 is poled to conduct in a direction opposite to that of the emitter-collector path. For convenience, the circuit junction of collector 17, diode 24 and capacitor 21 is denoted by the reference numeral 26 in FIGURE 1. Junction or terminal 26 constitutes one of the output terminals of network 13, the other output terminal of which is grounded. It is between terminal 26 and ground where a variable impedance is presented.

The oscillator itself is of conventional Hartley type construction. Parallel resonant circuit 22 includes a capacitor 27 and an inductance coil 28. Terminal 23 of tank circuit 22 is coupled through a D.C. blocking capacitor 29 to the base 31 of a junction type transistor 32 of the PNP variety, the emitter 33 of which is connected to a tap on inductor 28. A voltage divider, comprising a pair of series connected resistors 34 and 35, is connected between a source 36 of negative D.C. operating potential and ground. The junction of resistors 34 and 35 is connected to base 31 to apply a bias potential thereto. The collector 37 of transistor 32 is connected through a pair of series connected resistors 38, 39 to negative source 36 in order that an appropriate operating potential is applied to the collector. Transistor 32 is Class C operated. An A.C. bypass capacitor 41 couples negative source 36 to ground.

The output of the horizontal oscillator is applied to a driver stage. Specifically, the driver includes a junction type transistor 44 of the NPN variety, the base 45 of which is connected to the junction of resistors 38 and 39. The emitter 46 of the transistor is directly connected to negative potential source 36, while the collector 47 is coupled through the primary winding 49 of a transformer 50 to ground. Winding 49 is shunted by a series arrangement of a resistor 52 and a capacitor 53. The secondary winding 54 of the transformer is coupled to the input of a horizontal output stage, the output of which is coupled to a horizontal deflection yoke. For convenience, the output stage and yoke are illustrated in the drawing by a single block 55. A feedback connection 56 is provided between the horizontal output stage and an input of phase detector 12 to supply to the phase detector an alternating signal the phase of which is fixed or constant with respect to the output signal of the oscillator but is subject to phase variation, any time the oscillator drifts out of synchronism, with respect to the horizontal sync pulses produced by source 10.

In considering the operation of the described automatic frequency control arrangement, it will initially be assumed that the horizontal oscillator is properly synchronized and thus its output signal exhibits the desired phase relation with respect to the horizontal synchronizing components of the received television signal. Hence, the phase relation of the feedback signal on connection 56 and the horizontal sync pulses will be such that an automatic frequency control or error voltage is produced at the output of the phase detector of positive polarity and of a predetermined amplitude. The base-emitter junction of semiconductor device 15 thus becomes forward biased. During normal operation a positive voltage is developed by capacitor 21 (at its left terminal) and applied to collector 17 to reverse bias the base-collector junction.

To explain, parallel resonant circuit 22 developes a generally sinusoidal shaped signal voltage at terminal 23 (with its A.C. axis at zero volts or ground potential as shown by the signal waveform in FIGURE 1) which is applied across the series arrangement of capacitor 21 and variable impedance network 13. In response to at least the peaks of the negative half cycles, diode 24 is turned on or rendered conductive thereby permitting capacitor 21 to acquire a charge and develop a D.C. voltage with the polarity indicated in the drawing. In other words, unidirectional device 24 rectifies at least a portion of the sinusoidal signal produced at terminal 23 to develop across capacitor 21 a D.C. voltage, the left terminal of the capacitor being established at a positive potential. This voltage will be of the appropriate polarity to reverse bias the collector-base junction of transistor 15 and also to reverse bias the diode itself.

Of course, emitter-collector current will not flow through semiconductor device 15 during the negative half cycles of the sine wave from tank circuit 22, but during the alternate positive half cycles transistor 15 will be subjected to a strong reverse bias of its collector-base junction to cause normal transistor action with consequent emitter-collector current flow in an amount determined by the amplitude of the AFC control voltage applied to base 14. The impedance presented between emitter 16 and collector 17 is substantially resistive and of a magnitude which is inversely proportional to the amplitude of the applied AFC signal. The conduction angle of diode 24 (namely the number of degrees of the total 180° of each negative half cycle during which the diode conducts) is determined by the output impedance of transistor 15.

The net effect is that when the horizontal oscillator is appropriately synchronized by the sync pulses, the impedance of network 13 (namely between terminal 26 and ground) will be of a value to permit capacitor 21 to slightly modify the operating frequency of the oscillator, produced by resonant circuit 22 alone, to the end that the oscillating frequency will equal the repetition frequency of the horizontal sync pulses, and moreover so that the output signal of the oscillator will exhibit the desired phase relationship with respect to the sync pulses.

The sinusoidal signal voltage developed across tank circuit 22 is of sufficient magnitude to drive transistor 32 alternately between saturation and cutoff to effectively convert the sinusoidal signal to one of rectangular waveform, the relative size of resistors 34 and 35 determining the widths of the positive and negative-going pulse components. The rectangular shaped voltage signal appears at the junction of resistors 38 and 39 and is applied to transistor 44 of the driver amplifier to drive that stage between saturation and cutoff to produce an amplified rectangular shaped voltage signal across primary winding 49 of transformer 50 for application to the input of the horizontal output stage in unit 55. Resistor 52 and capacitor 53 are provided to attenuate any transients. In response to the applied signal, the horizontal output stage effects the development of a sawtooth shaped current signal in the deflection yoke appropriate to cause horizontal or line scanning of the electron beam in a television picture tube.

If operating conditions change or if for any reason the desired phase relation of the received synchronizing pulses and the locally generated scanning signal should change, this is reflected as an amplitude change in the output voltage of phase detector 12. Assuming, for example, that the horizontal oscillator tends to operate at a faster or higher frequency than the frequency of the horizontal syncs, the amplitude of the automatic frequency control voltage or error signal increases causing the impedance presented by network 13 to decrease which in turn results in an increase of the influence of capacitor 21 on the operating frequency of the oscillator. Increasing the effect of capacitor 21 on tank circuit 22 causes the oscillator to decrease its operating frequency until it again oscillates precisely at the same frequency of the line syncs. Conversely, if the oscillator tends to operate at a frequency lower than the desired line sync frequency, the AFC signal decreases in amplitude causing the impedance network to interpose a higher impedance in series with capacitor 21. The capacitor thus plays a lesser role in determining the frequency of the oscillator with the result that the operating frequency will increase to the extent necessary to once again resume operation at the required frequency of the line sync pulses.

The high sensitivity achieved by the invention is attributable to the construction of variable impedance network 13. This may best be explained by considering the operation of the invention for two extreme conditions. Initially assume that the phase of the oscillator output signal leads that of the line syncs (namely the oscillating frequency is too high) to such an extent that the AFC voltage is of a magnitude sufficiently high to drive semiconductor device 15 into saturation. When that occurs, the impedance presented by network 13 will be substantially zero at all times—namely for both the positive and negative half cycles of the sinusoidal voltage signal developed by resonant circuit 22 at terminal 23. The positive half cycles will cause conduction through the zero impedance (at saturation) emitter-collector path, while the negative half cycles will be effectively translated through the zero impedance path of diode 24. Hence, terminal 26 will essentially be at ground potential for both half cycles thereby causing capacitor 21 to be directly coupled across tank circuit 22 to lower the operating frequency of the oscillator. When transistor 15 is saturated, capacitor 21 accumulates no significant charge and thus develops no appreciable reverse bias for diode 24. The conduction angle for the diode will therefore be approximately 180°.

Assume now that the oscillator tends to slow down so that the phase of the feedback signal on connection 56 lags that of the line syncs sufficiently to cause the AFC voltage to reduce in magnitude to the extent that semiconductor device 15 becomes cut off. In that condition, transistor 15 cannot be turned on by the positive half cycles of the sine wave signal developed by resonant circuit 22. As a consequence, capacitor 21 and diode 24 effectively comprise a conventional diode clamping circuit which shifts the waveform of the sinusoidal signal appearing at the right terminal of capacitor 21, where its A.C. axis is zero or ground potential, in a positive direction so that the signal as it appears at the left terminal of the capacitor is substantially entirely above or positive with respect to ground. In other words, it clamps the bottom of the voltage waveform (the negative peaks) to zero. Capacitor 21 therefore acquires a substantial charge to develop a D.C. voltage, with the polarity indicated in the drawing, of a magnitude (approximately the average value of the sine wave or one-half of its peak-to-peak value) to impose a significant reverse bias on diode 24. Only the extreme peak portions of the negative half cycles of the sine wave will be sufficient in amplitude to exceed that reverse bias and thus the diode will conduct for only a relatively short interval during each cycle of the sine wave. Its conduction angle will be only a few degrees.

This has the effect of presenting across the output terminals of network 13 (between terminal 26 and ground) an impedance which is relatively high and substantially equal to the impedance presented by the output terminals (between emitter 16 and collector 17) of transistor 15. Hence, diode 24 does not materially reduce the output impedance of a transistor 15 during cut off for either the positive or negative half cycles and yet, on the other hand, when the transistor is saturated diode 24 insures that the output impedance of network 13 will be substantially zero for both the positive and negative half cycles. In prior art arrangements, this has not been true. It has not been possible to reduce the impedance of a variable impedance device, connected in series with a capacitor, to zero for both positive and negative half cycles. The impedance has been reduced to zero at most only half the time—namely, only during the half cycles of one polarity.

Since impedance network 13 is capable of being varied from approximately zero (when the transistor is saturated) to a relatively high value (when cut off) in response to a variation in amplitude of the AFC signal over a range, any given amplitude change within that range effects an impedance change which will be greater than achieved in prior arrangements for the same given amplitude change of the AFC signal because of the increased wide range over which the impedance of the invention may vary.

Thus, the slightest drift of the oscillator will effect a substantial change in the impedance of the variable impedance network with the result that the oscillator is restored to synchronous operation. The sensitivity of an AFC system is the extent of the frequency change of the oscillator resulting from a given amplitude change of the AFC or error signal. The relatively large impedance change caused by a relatively small amplitude change of the AFC signal makes the system extremely sensitive.

Of course, it is not necessary that the AFC circuit be designed so that the AFC control voltage varies over a range sufficient to operate transistor 15 between saturation and cutoff. Excellent control may be achieved by merely varying the amplitude of the control voltage over a relatively smaller range without driving the transistor even close to saturation or cutoff.

As shown in FIGURE 1, the AFC arrangement is so extremely sensitive to changes in oscillator frequency that for many applications it may be desirable to reduce that sensitivity. This may be achieved by interposing a series resistor between emitter 16 and ground. Such a resistor provides additional advantages. It has a degenerative effect thus increasing the input impedance of transistor 15. This allows maximum freedom in the design of the phase detector. Moreover, an emitter resistor renders the make up of the particular transistor employed less critical. It may be replaced by another transistor without disturbing the operation of the system.

To summarize the FIGURE 1 embodiment of the invention, an automatic frequency controlled scanning signal generator is disclosed which comprises a free-running oscillator having a parallel resonant circuit 22 for primarily determining the free-running operating frequency of the oscillator. There is a variable impedance network 13 including a semiconductor device 15 having input, output and common terminals (namely the terminals connected respectively to base 14, collector 17 and emitter 16) with an output conductive path between its output and common terminals (namely the emitter-collector conduction path) in a predetermined direction. Network 13 also includes a unidirectional device 24 coupled at least partially in shunt with the output conductive path and poled to conduct in a direction opposite to that of the shunted path. The impedance presented by network 13 varies over a relatively wide range in response to amplitude variations of a control signal applied between the input and common terminals, namely between the base and emitter. A series arrangement, including the variable impedance network and a capacitor 21, is coupled in shunt with resonant circuit 22. The effectiveness of the capacitor in determining the operating frequency of the oscillator is inversely proportional to the impedance presented by network 13. Phase detector 12 provides means for applying an automatic frequency control signal between the input and common terminals of semiconductor 15 to control the impedance of impedance network 13 thereby to control the operating frequency of the oscillator.

While diode 24 shunts the output or emitter-collector conduction path in FIGURE 1, this is not essential and the impedance network may be modified to place that diode at least partially in shunt with the input or base-emitter conduction path. Such a modification of FIGURE 1 is illustrated in FIGURE 2. The diode, labeled 24', is shown as having its cathode terminal connected to base 14 and its anode terminal grounded. During the positive half cycles of the sinusoidal signal applied to capacitor 21 and transistor 15 from tank circuit 22, the arrangement of FIGURE 2 operates in similar fashion to FIGURE 1. In other words, transistor 15 in FIGURE 2 conducts through its emitter-collector conduction path responsive to the positive half cycles applied to collector 17. For the alternate negative half cycles (or at least a portion thereof) of the sine wave, however, the base-collector junction in FIGURE 2 becomes forward biased to cause the application of those negative half cycles to the cathode of diode 24' which in turn renders the diode conductive. Hence, FIGURE 2 differs from FIGURE 1 in that the negative half cycles (or portions thereof) are transferred to the diode through the base-collector junction.

In FIGURES 1 and 2 the transistor included in the variable impedance network operates in a common emitter configuration or mode. This, of course, is not necessary and other configurations may be employed. FIGURE 3 shows the construction of variable impedance network 13 when the transistor is connected in its common base configuration. The transistor is again of the NPN type, being designated by the numeral 15' with its base, emitter and collector being labeled 14', 16', and 17', respectively. The emitter 16' is connected to the ungrounded terminal of phase detector 12, collector 17' is coupled through capacitor 21 to tank circuit 22, and base 14' is coupled through a resistor 59 to ground. Diode 24 in FIGURE 3 is connected between collector 17' and ground, the cathode of the diode being connected to collector 17'. Resistor 59 is not necessary but has only been shown to illustrate that the invention functions even though the diode is not placed directly in parallel with one of the conduction paths of the transistor. As mentioned previously, a resistor, like resistor 59, may be included to decrease the sensitivity of the AFC arrangement if so desired, to increase the input resistance of the transistor, and to make it easier to interchange transistors if ever necessary.

During the occurrence of positive half cycles of the sinusoidal voltage from tank circuit 22, transistor 15' is rendered conductive and those half cycles pass through the collector-base junction. In response to at least the peaks of the alternate negative half cycles, diode 24 is turned on to translate those signal portions to ground. The base-collector junction of transistor 15' also becomes forward biased, and functions as a diode, in response to the negative half cycles and thus will conduct at the same time as diode 24. Hence, diode 24 actually is not necessary in FIGURE 3 and may be disconnected entirely. The collector-base junction presents an impedance which varies in response to amplitude variations of the AFC signal applied between emitter 16' and base 14'.

Of course, while NPN type transistors have been shown for transistors 15 and 15', it is obvious that by simple modification transistors of opposite gender, namely PNP, can be utilized. Moreover, it should be also appreciated that the semiconductor device in the variable impedance network need not even be a junction type transistor but may comprise any semiconductor device having input, output and common terminals, the impedance presented between its common and output terminals varying in response to amplitude variations of a control signal applied between its input and common terminals. For example, a field effect transistor may be employed.

The invention provides, therefore, an extremely sensitive automatic frequency control arrangement for controlling and synchronizing the operation of a free-running oscillator. A resonant circuit, which primarily determines the oscillating frequency, is at least partially shunted by a capacitor series connected with a variable impedance device, the impedance of which is determined by an applied AFC signal. Relatively small amplitude variations of the AFC signal effect substantially changes in the operation of the oscillator, thereby enhancing the synchronous operation of the oscillator.

While particular embodiments of the invention have been shown and described, modifications may be made, and it is intended in the appended claims to cover all such modifications as may fall within the true spirit and scope of the invention.

I claim:

1. An automatic frequency controlled signal generator comprising:

a free-running oscillator including a resonant circuit for primarily determining the free-running operating frequency of said oscillator;

a variable impedance network including a semiconductor device having input, output and common terminals with an input conductive path between its input and common terminals in a predetermined direction and an output conductive path between its output and common terminals in a predetermined direction, and a unidirectional device coupled at least partially in shunt with one of said conductive paths and poled to conduct in a direction opposite to that of the shunted path, the impedance presented by said network varying over a relatively wide range in response to amplitude variations of a control signal applied between said input and common terminals;

a series arrangement, including said variable impedance network and a capacitor, coupled in shunt with at least a portion of said resonant circuit, the effectiveness of said capacitor in determining the operating frequency of said oscillator being inversely proportional to the impedance presented by said network;

and means for applying an automatic frequency control signal between said input and common terminals to control the impedance of said impedance network thereby to control the operating frequency of said oscillator.

2. An automatic frequency controlled signal generator according to claim 1 in which said resonant circuit is a parallel resonant circuit and in which said series arrangement is coupled in shunt with said parallel resonant circuit.

3. An automatic frequency controlled signal generator according to claim 1 in which said semiconductor device is a transistor having a base, a collector and an emitter connected respectively to said input, output and common terminals, and wherein said unidirectional device is a diode one terminal of which is coupled to said collector while the other terminal is coupled to said emitter.

4. An automatic frequency controlled signal generator according to claim 1 in which said semiconductor device is a transistor having a base, a collector and an emitter connected respectively to said input, output and common terminals, and wherein said unidirectional device is a diode having its cathode terminal coupled to said collector and its anode terminal coupled to said emitter.

5. An automatic frequency controlled signal generator according to claim 1 in which said semiconductor device is a transistor having a base, a collector and an emitter connected respectively to said input, output and common terminals, and wherein said unidirectional device is a diode having its cathode terminal coupled to said base and its anode terminal coupled to said emitter.

6. An automatic frequency controlled signal generator according to claim 1 in which said semiconductor device is a transistor having an emitter, a collector and a base connected respectively to said input, output and common terminals, and wherein said unidirectional device is a diode having its cathode terminal coupled to said collector and its anode terminal coupled to said base.

7. An automatic frequency controlled signal generator according to claim 1 in which said unidirectional device is coupled at least partially in shunt with said output conductive path.

8. An automatic frequency controlled signal generator according to claim 1 wherein said resonant circuit is a parallel resonant circuit which develops a generally sinusoidal signal and in which said unidirectional device rectifies at least a portion of said sinusoidal signal to develop across said capacitor a voltage for biasing both said unidirectional device and said semiconductor device.

9. An automatic frequency controlled signal generator according to claim 1 in which said semiconductor device is a junction type transistor having a base, a collector and an emitter connected respectively to said input, output and common terminals, wherein said unidirectional device is a diode one terminal of which is coupled to said collector while the other terminal is coupled to said emitter, wherein said resonant circuit is a parallel resonant circuit which develops a generally sinusoidal signal, and in which said diode rectifies at least a portion of said sinusoidal signal to develop across said capacitor a voltage for reverse biasing said diode and also for reverse biasing the collector-base junction of said transistor.

10. An automatic frequency controlled signal generator comprising:

a free-running oscillator including a resonant circuit for primarily determining the free-running operating frequency of said oscillator;

a variable impedance network including a semiconductor device having input, output and common terminals, and a two-terminal unidirectional device one terminal of which is coupled to said common terminal while the other terminal is coupled to one of said input and output terminals, the impedance presented by said network varying over a relatively wide range in response to amplitude variations of a control signal applied between said input and common terminals;

a series arrangement, including said variable impedance network and a capacitor, coupled in shunt with at least a portion of said resonant circuit, the effectiveness of said capacitor in determining the operating frequency of said oscillator being inversely proportional to the impedance presented by said network;

and means for applying an automatic frequency control signal between said input and common terminals to control the impedance of said impedance network thereby to control the operating frequency of said oscillator.

11. An automatic frequency controlled signal generator comprising:

an oscillator;

a variable impedance network including a semiconductor device having input, output and common terminals with an input conductive path between its input and common terminals in a predetermined direction and an output conductive path between its output and common terminals in a predetermined direction, and a unidirectional device coupled at least partially in shunt with one of said conductive paths and poled to conduct in a direction opposite to that of the shunted path, the impedance presented by said network varying over a relatively wide range in response to amplitude variations of a control signal applied between said input and common terminals;

means for utilizing said variable impedance network to at least partially determine the operating frequency of said oscillator in accordance with the impedance presented by said network;

and means for applying an automatic frequency control signal between said input and common terminals to control the impedance of said impedance network thereby to control the operating frequency of said oscillator.

References Cited by the Examiner

UNITED STATES PATENTS

| | | | |
|---|---|---|---|
| 2,844,795 | 7/1958 | Herring | 332—16 |
| 2,888,648 | 5/1959 | Herring | 331—8 |
| 2,951,995 | 9/1960 | Rosier et al. | 332—16 |

ROY LAKE, *Primary Examiner.*

JOHN KOMINSKI, *Examiner.*